United States Patent [19]

Nisenson

[11] Patent Number: 5,392,887
[45] Date of Patent: Feb. 28, 1995

[54] BI-DIRECTIONAL TAPERED ROLLER CLUTCH

[75] Inventor: Jules Nisenson, Stamford, Conn.

[73] Assignee: Introl Company, L.P., Wappingers Falls, N.Y.

[21] Appl. No.: 172,941

[22] Filed: Dec. 27, 1993

[51] Int. Cl.$^6$ ............... F16D 67/02; F16D 41/10; E06B 9/208
[52] U.S. Cl. ............................ 192/8 R; 160/297; 192/16; 192/38
[58] Field of Search ............... 188/82.84; 160/297; 192/8 R, 7, 15, 16, 38, 45

[56] References Cited

U.S. PATENT DOCUMENTS

| | | | |
|---|---|---|---|
| 814,301 | 3/1906 | Kunz | 192/8 R |
| 4,253,554 | 3/1981 | Nisenson | 192/8 R |
| 4,982,823 | 1/1991 | Yoshida | 192/38 |
| 5,035,309 | 7/1991 | Takada | 192/45 |
| 5,109,964 | 5/1992 | Fukui et al. | 192/45 X |

Primary Examiner—Rodney H. Bonck
Attorney, Agent, or Firm—Charles E. Temko

[57] ABSTRACT

A relatively light duty cone type clutch suitable for use in window blind or shade mechanisms is disclosed. As contrasted with conventional cone type clutches, the disclosed embodiment includes a plurality of radially arranged conically shaped rollers which are maintained in position by a spider forming part of a motion input pulley. The rollers are urged into engaged condition between a fixed clutch body and a polygonally shaped motion output core. The clutch is maintained in engaged condition by residual torque upon the output core provided by the weight of the unwound portion of the shade or blind. Upon the occurrence of rotary motion imparted to the pulley in either direction, the movement of the spider dislodges the rollers in an axial direction from engagement with the clutch body, following which motion is transmitted through the spider and rollers directly to the output core. When motion ceases, the rollers are returned to static position by a pressure washer carried by the spider.

7 Claims, 5 Drawing Sheets

BI-DIRECTIONAL TAPERED ROLLER CLUTCH

BACKGROUND OF THE INVENTION

This invention relates generally to the field of relatively small motion transmitting clutches which serve to lock a motion output member against movement in the absence of input motion imparted by a user, and which will assume a disengaged mode for the transmission of such input motion. Devices of this general type are known in the art, and the invention lies in specific constructional details which provide improved operation, facilitated manufacture, and extended useful life. While not limited to application in any particular area of utility, the disclosed embodiment is particularly useful as a component of shade or blind hardware installed in a window.

Venetian blinds and similar shades include an upper horizontal member carried by a fixed valance. The slats are carried by vertical tapes having horizontal support members which may be angled to rotate the slats. The entire blind is raised or lowered by a vertical cord entrained upon a horizontally mounted rotatable shaft and connected to the lowermost slat. The blinds are relatively heavy, and the shaft is, accordingly, provided with a motion inhibiting clutch for maintaining a desired adjustment against the weight of the unwound segment of the blind. To a lesser extent, the same action occurs when using a flexible planar shade.

It is known in the art to employ for this purpose clutches employing a spirally wound radially contractile spring, or plurality of springs, which expand to allow movement of an enclosed shaft, and contract to grip the shaft against further rotation when imparted motion transmitted through a pulley ceases. While not without utility, clutches of this type have several serious shortcomings, most of which are sourced in the problem of releasing the shaft for movement by initially imparting a spring expanding force at one end of the spring. Clutches of this type do not lend themselves to manufacture in the form of injection-molded parts, and are otherwise relatively expensive to manufacture because of less than simple assembly.

SUMMARY OF THE INVENTION

Briefly stated, the invention contemplates the provision of an improved clutch construction of the type described having the qualities of improved ease of manufacture, and accompanying low manufacturing cost, reliability, and improved facility in operation by a user.

To this end, the disclosed embodiment comprises a fixed outer clutch body, within which a motion output core is rotatably positioned. Both the clutch body and the core have opposed tapered surfaces of conicity approximating four to ten degrees included angle. Disposed within the housing is a motion input pulley about which an adjustment cord is entrained. The pulley is completely integrally formed upon a spider element having radially arranged tapered recesses extending into the annular space between the fixed clutch body and the output core. Disposed within each of the recesses is a frusto-conical roller which is urged into wedging position by a resilient pressure washer keyed to the pulley and applying an axially directed force to the rollers which provide intimate contact between input and output members through the rollers and immobilizes the motion output core. The spider, surfaces of which engage the longitudinal surfaces of the tapered rollers substantially throughout the length thereof, also serves to disengage the rollers upon the input of motion through the pulley to a degree sufficient to allow motion of the core.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 12:
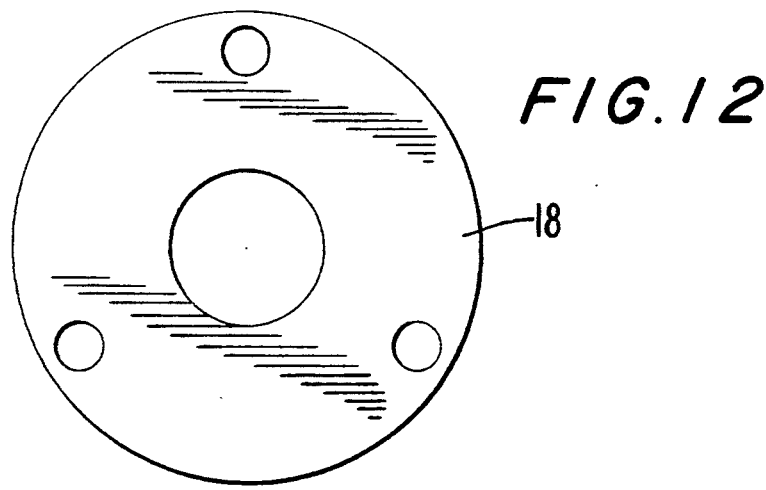
FIG. 12 is an end elevational view of a cover member.

In accordance with the invention, the device, generally indicated by reference character 10, comprises broadly: a fixed clutch body element 11, a core output element 12, a pulley element 13, a spider element 14, a plurality of tapered roller members 15, an output shaft member 16, and an axial pressure spring washer 17, and a cover member 18 (FIG. 12).

Figure 13:
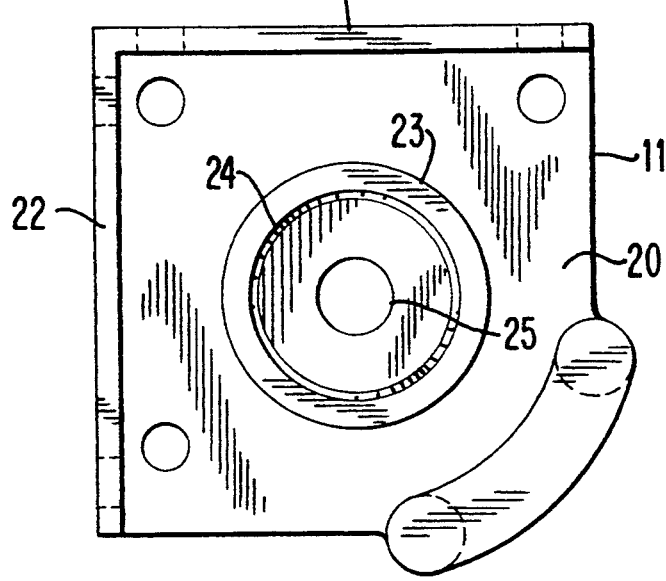
FIG. 13 is a side elevational view of a fixed body element.
Figure 14:
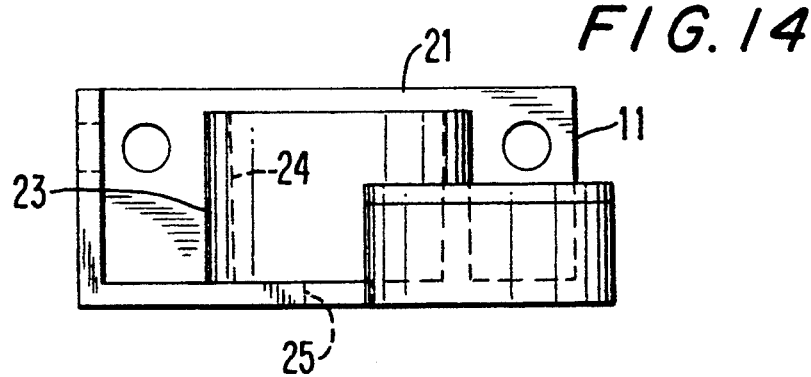
FIG. 14 is a bottom plan view thereof.
Figure 15:
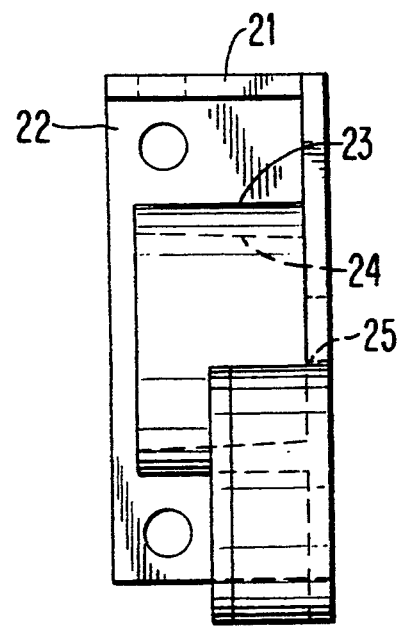
FIG. 15 is a side elevational view thereof.

The clutch body element 11 (FIGS. 13–15), for economy of manufacture and relatively light weight, is preferably formed of molded synthetic resinous material and forms a mounting bracket. It includes an end wall 20, top and side flanges 21 and 22, and a centrally positioned cylindrical flange 23. The flange 23 includes an axially oriented frusto-conical bore 24, A cylindrical bore 25 forms a bearing surface for the core output element 12.

Figure 9:
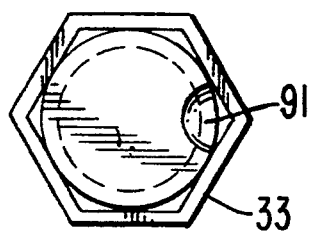
FIG. 9 an end elevational view of an output core element.
Figure 10:
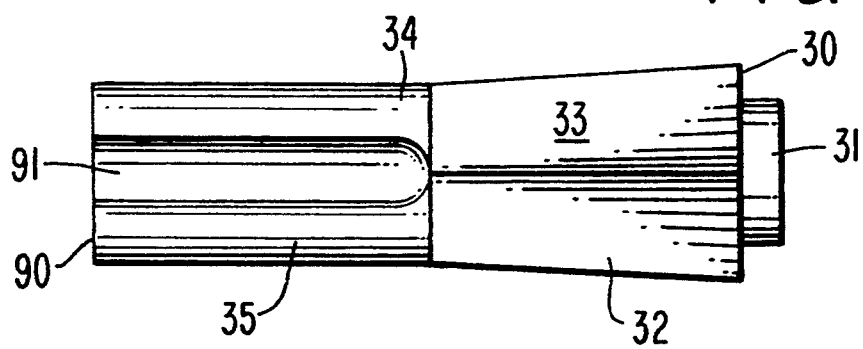
FIG. 10 is a side elevational view thereof.
Figure 11:
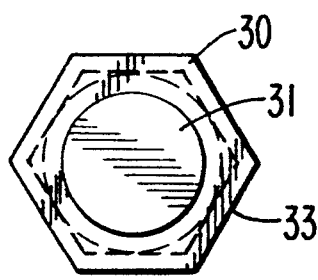
FIG. 11 is a second end elevational view thereof.

The core output element 12 (FIGS. 9–11) is also preferably formed as a synthetic resinous molding. An outer end 30 mounts a cylindrical stub 31 which forms a bearing surface. A roller engaging member 32 includes a plurality of planar tapered surfaces 33 extending to a second bearing surface 34. Leftwardly of the surface 34 is a cylindrical output shaft 35. An axially aligned bore 36 accommodates the output shaft member 16, the shaft having means (not shown) about which a shade or venetian blind cord may be wound.

Figure 6:
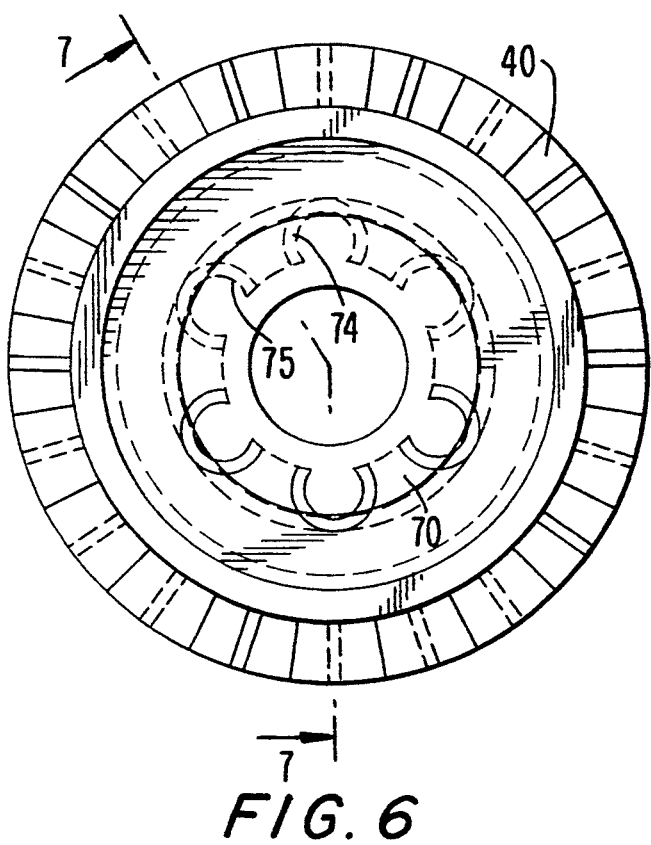
FIG. 6 is an end elevational view of a roller retaining spider element.
Figure 7:
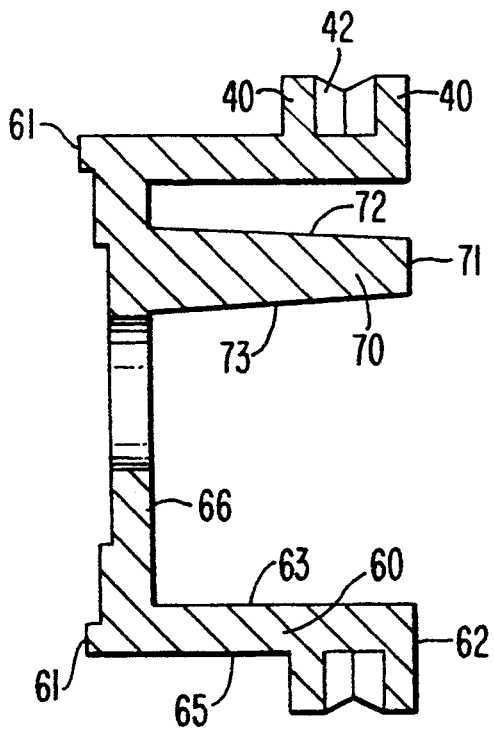
FIG. 7 is a longitudinal central sectional view of the spider element, as seen from the plane 7—7 in FIG. 6.
Figure 8:
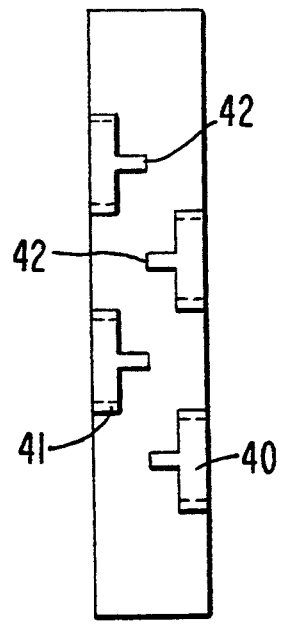
FIG. 8 is an enlarged fragmentary view of a pulley member.

The pulley element 13 is molded integrally with the spider element 14, and includes a first flange member 40 (FIGS. 6–8) and a second flange member 41 (FIG. 7). Each of the flange members 40–41 includes cord engaging projections 42 for entraining a pull cord (not shown) in non-slipping relation.

The spider element 14 includes a cylindrical body 60 bounded by an outer end surface 61, an inner end surface 62, and includes a cylindrical bore 63. An outer cylindrical surface 65 extends between the pulley element 13 and surface 61.

Inwardly of an interior surface 66 is a plurality of laterally extending fingers 70, each bounded by an end surface 71, an arcuate outer surface 72, an inner arcuate surface 73, as well as first and second frusto-conical surfaces 74 and 75.

Figure 3:
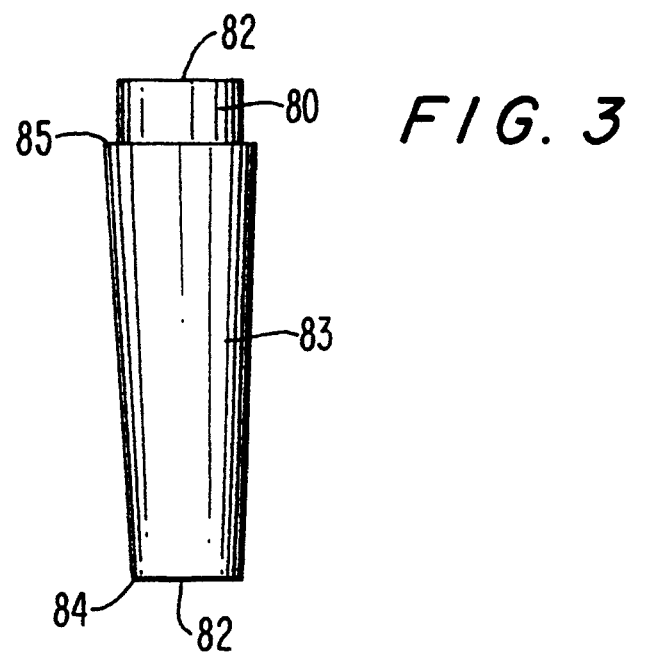
FIG. 3 is a side elevational view of a frusto-conical roller forming a part of the disclosed embodiment.
Figure 4:
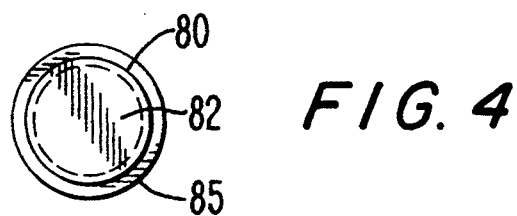
FIG. 4 is a top plan view as seen from the upper portion of FIG. 3.

Referring to FIGS. 3 and 4, the roller members 15 are identical, and, accordingly, a description of one of the rollers will serve to describe all. Again, they are preferably integrally molded from synthetic resinous material. Each is bounded by a first end surface 81, a second end surface 82, on a cylindrical portion 80, and a frusto-conical side surface 83 which meets the end surfaces 81 and portion 80 in first and second circular edges 84 and 85. The angle of conicity of the surface 83 is approximately four to ten degrees included angle.

The output shaft member 16 is preferably formed integrally with the core output element 12, and extends to an outer end 90 defining a keyway 91 for engaging a blind supporting roller (not shown).

Figure 5:
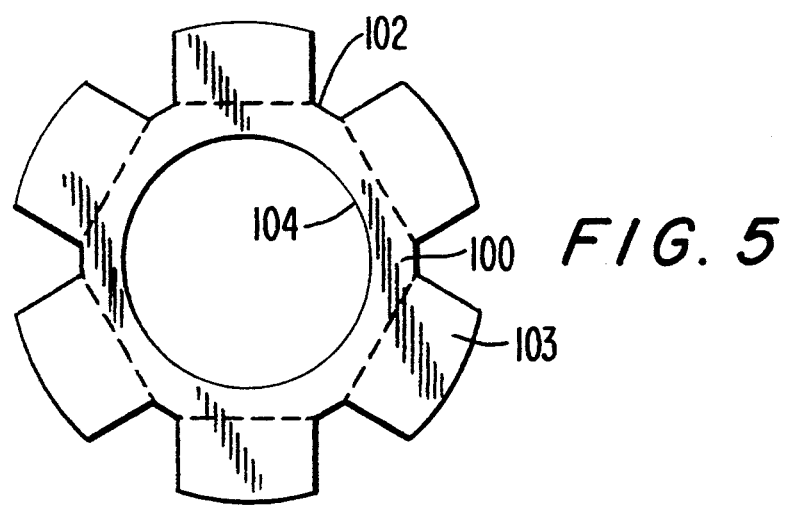
FIG. 5 is a side elevational view of a pressure washer forming another part of the embodiment.

The axial pressure spring washer 17 (FIG. 5) is most conveniently formed as a plastic molding. It is bounded by first and second planar surfaces 100 and 101; an outer arcuate edge 102 from which resilient fingers 103 extend, as well as an inner arcuate edge 104 surrounding the stub 31. The cover member 18 engages a recess 105 in the spider element to maintain the washer 17 in position.

OPERATION

Figure 1:
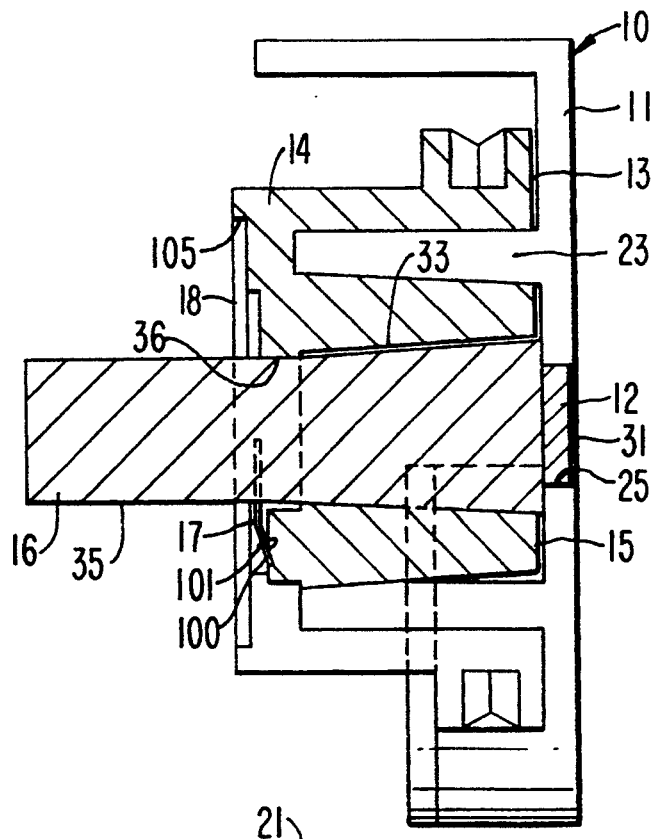
FIG. 1 is a fragmentary longitudinal sectional view of an embodiment of the invention, as seen from the plane 1—1 in FIG. 2.
Figure 2:
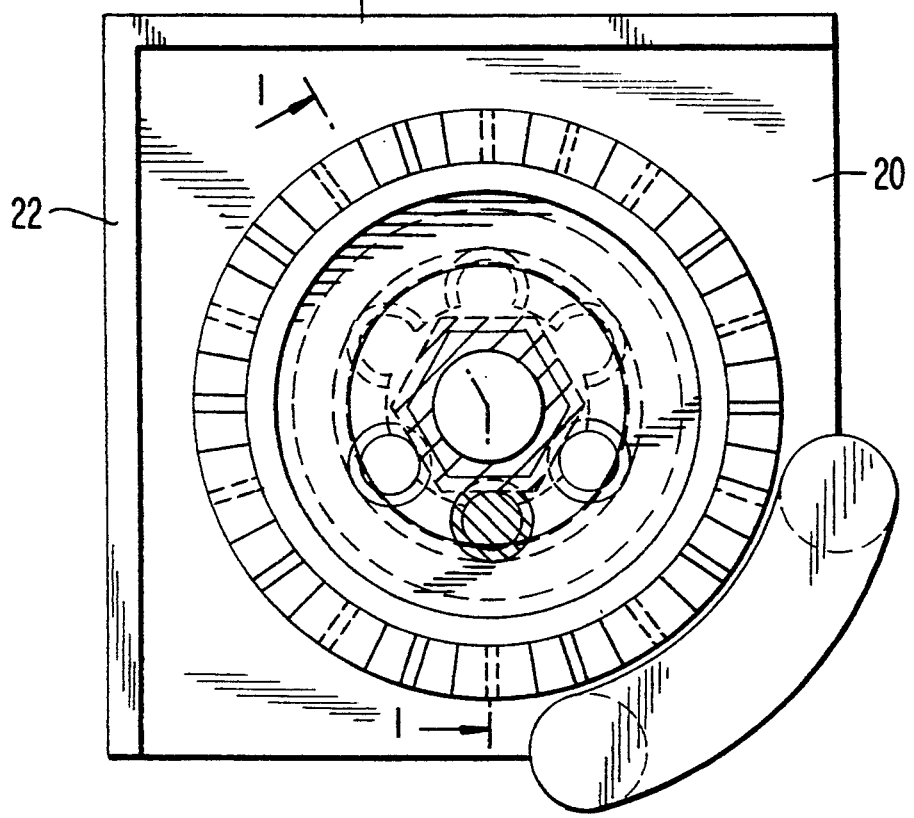
FIG. 2 is an end elevational view thereof as seen from the left-hand portion of FIG. 1.

Operation of the embodiment will be evident from a consideration of FIG. 1. With the output shaft stationary and under load from the weight of the unwound portion of the blind or shade, a torque will be exerted on the core output element 12 which is transmitted to the surfaces 33 and to the side surfaces 83 of the roller members 15. This force is transferred to the corresponding surface 24 of the body element 11 which resists turning movement, thus maintaining the core output element 12 in locked condition. While in such static condition, the washer 17 resists any tendency for the roller members to move leftwardly as seen in FIG. 1. The wedging action is also exerted on the spider element 14 which is also in wedged condition relative to both the body element 11 and the core output element 12.

Adjusting the position of the shade or blind is accomplished by imparting motion to the pulley element 13 through the manually operated cord in the desired direction. Since the effective diameter of the pulley is substantially greater than that of the shaft, insufficient torque is present to overcome the adjusted condition of the blind while permitting a relatively light tension on the cord to cause movement. When the user imparts such torque, it is imparted directly to the spider element 14 and the laterally oriented fingers 70 to result in displacing the roller members 15 from locked engagement, the relatively low force exerted by the spring washer 17 being overcome. At this point, further rotary motion in either rotational direction is transmitted through the spider element directly to the core output element via the contact of the roller members with the planar tapered surfaces 33. When the shade has reached the desired adjustment level, the input torque ceases, and the elements revert to the static state above described.

I wish it to be understood that I do not consider the invention to be limited to the precise details of structure shown and set forth in the specification, for obvious modifications will occur to those skilled in the art to which the invention pertains.

I claim:

1. An improved bi-directional clutch comprising: a relatively fixed body element having a principal axis; a core output element axially aligned for rotation within said body element; a spider element including a generally cylindrical body, motion input means on one end of said body, and a plurality of axially extending fingers projecting from a second end of said body, said fingers forming a plurality of radially arranged frusto-conical recesses; a corresponding plurality of frusto-conically shaped rollers positioned within said recesses for limited axial movement relative thereto, said rollers in engaged condition being wedged between said body element and said core output element to arrest relative rotational movement therebetween; said rollers being axially displaced to release said engaged condition by rotational movement imparted to said spider element; whereby continued movement is transmitted through said spider element and said rollers directly to said core output element.

2. A bi-directional clutch in accordance with claim 1, further comprising a pressure spring washer supported by said spider element for resiliently urging said rollers toward an engaged condition.

3. A bi-directional clutch in accordance with claim 1 in which said body element forms a cylindrical housing supporting said core output element.

4. A bi-directional clutch in accordance with claim 1 in which said frusto-conical rollers have an angle of conicity approximating six degrees included angle.

5. A bi-directional clutch in accordance with claim 1 including a motion input pulley formed integrally with said spider element.

6. A bi-directional clutch in accordance with claim 1 including a pressure spring washer fixed upon said spider element and having fingers each bearing upon an end of a corresponding roller.

7. A bi-directional clutch in accordance with claim 1 in which said core output element includes an end member having plural tapered planar surfaces for the transmission of imparted motion through said rollers and said spider element.

* * * * *